United States Patent
Barnes et al.

(10) Patent No.: US 9,098,466 B2
(45) Date of Patent: Aug. 4, 2015

(54) SWITCHING BETWEEN MIRRORED VOLUMES

(71) Applicant: INTERNATIONAL BUSINESS MACHINES CORPORATION, Armonk, NY (US)

(72) Inventors: Jeffrey M. Barnes, Tucson, AZ (US);
Gary S. Domrow, Austin, TX (US);
Nicholas S. Ham, Austin, TX (US);
Carol S. Mellgren, Tucson, AZ (US);
Jared M. Minch, Tucson, AZ (US);
Stephen M. Tee, Marble Falls, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 13/663,221

(22) Filed: Oct. 29, 2012

(65) Prior Publication Data
US 2014/0122816 A1    May 1, 2014

(51) Int. Cl.
*G06F 12/00* (2006.01)
*G06F 11/20* (2006.01)
*G06F 12/06* (2006.01)
*G06F 13/38* (2006.01)
*G06F 13/20* (2006.01)
*G06F 3/06* (2006.01)

(52) U.S. Cl.
CPC .............. *G06F 11/20* (2013.01); *G06F 3/0601* (2013.01); *G06F 3/062* (2013.01); *G06F 3/065* (2013.01); *G06F 3/0668* (2013.01); *G06F 12/0623* (2013.01); *G06F 13/20* (2013.01); *G06F 13/38* (2013.01)

(58) Field of Classification Search
CPC ...... G06F 3/0601; G06F 3/062; G06F 3/0668; G06F 3/065; G06F 12/0623; G06F 13/20; G06F 13/38
USPC .............. 711/149, 154, 162; 709/239; 710/38, 710/316; 714/4.11, 4.12
See application file for complete search history.

(56) References Cited

U.S. PATENT DOCUMENTS

| | | | |
|---|---|---|---|
| 5,790,775 A | 8/1998 | Marks et al. | |
| 6,499,112 B1 * | 12/2002 | Milillo et al. | 714/6.31 |
| 6,643,795 B1 | 11/2003 | Sicola et al. | |
| 6,691,245 B1 * | 2/2004 | DeKoning | 714/6.31 |
| 6,732,104 B1 * | 5/2004 | Weber | 1/1 |
| 6,757,753 B1 * | 6/2004 | DeKoning et al. | 710/38 |
| 7,058,731 B2 * | 6/2006 | Kodama | 710/5 |
| 7,676,702 B2 * | 3/2010 | Basham et al. | 714/47.1 |
| 7,877,628 B2 | 1/2011 | Boyd et al. | |
| 7,895,395 B2 | 2/2011 | Ninose | |
| 8,060,710 B1 | 11/2011 | Don et al. | |
| 2002/0133512 A1 * | 9/2002 | Milillo et al. | 707/204 |
| 2003/0065780 A1 | 4/2003 | Maurer, III et al. | |
| 2004/0064639 A1 * | 4/2004 | Sicola et al. | 711/114 |
| 2006/0031594 A1 * | 2/2006 | Kodama | 710/5 |

(Continued)

*Primary Examiner* — Reba I Elmore
(74) *Attorney, Agent, or Firm* — Griffiths & Seaton PLLC

(57) ABSTRACT

Techniques for switching between mirrored volumes are described. A system may comprise a multi-path device driver and a processor device, in communication with the multi-path device driver, operable in the computing storage environment. The processor device creates a copy relation identification (ID) between mirrored volumes for using the copy relation ID in conjunction with a multi-path device driver for switching input/output (I/O) for applications between a first path to a second path between the mirrored volumes.

24 Claims, 6 Drawing Sheets

(56) References Cited

U.S. PATENT DOCUMENTS

| | | |
|---|---|---|
| 2007/0006023 A1* | 1/2007 | Fujibayashi .................. 714/7 |
| 2007/0300013 A1* | 12/2007 | Kitamura ..................... 711/114 |
| 2008/0126857 A1* | 5/2008 | Basham et al. ............... 714/25 |
| 2009/0235110 A1* | 9/2009 | Kurokawa ..................... 714/3 |
| 2010/0049823 A1* | 2/2010 | Saigo et al. .................. 709/216 |
| 2012/0137096 A1 | 5/2012 | Maki et al. |
| 2012/0278572 A1* | 11/2012 | Broido et al. ................ 711/162 |

* cited by examiner

SWITCHING BETWEEN MIRRORED VOLUMES

BACKGROUND OF THE INVENTION

1. Field of the Invention

The present invention relates in general to computers, and more particularly to switching between mirrored volumes in a computing environment.

2. Description of the Related Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to manage the flow of data. Moreover, the computer system may include a complex data processing system or computing environment. A data processing system often requires computational resources or availability requirements that cannot be achieved by a single computer.

Moreover, Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

SUMMARY OF THE DESCRIBED EMBODIMENTS

In one embodiment, a method is provided for switching between mirrored volumes, in a computing environment, is provided. For switching between mirrored volumes, a copy relation identification (ID) is created between mirrored volumes for using the copy relation ID in conjunction with a multi-path device driver for switching input/output (I/O) for applications between a first path to a second path between the mirrored volumes.

In another embodiment, a computer system is provided switching between mirrored volumes, in a computing environment. The computer system includes a computer-readable medium and a processor in operable communication with the computer-readable medium. The processor creates a copy relation identification (ID) between mirrored volumes for using the copy relation ID in conjunction with a multi-path device driver for switching input/output (I/O) for applications between a first path to a second path between the mirrored volumes.

In a further embodiment, a computer program product is provided for switching between mirrored volumes, in a computing environment. The computer-readable storage medium has computer-readable program code portions stored thereon. The computer-readable program code portions include a first executable portion that creates a copy relation identification (ID) between mirrored volumes for using the copy relation ID in conjunction with a multi-path device driver for switching input/output (I/O) for applications between a first path to a second path between the mirrored volumes.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1A:
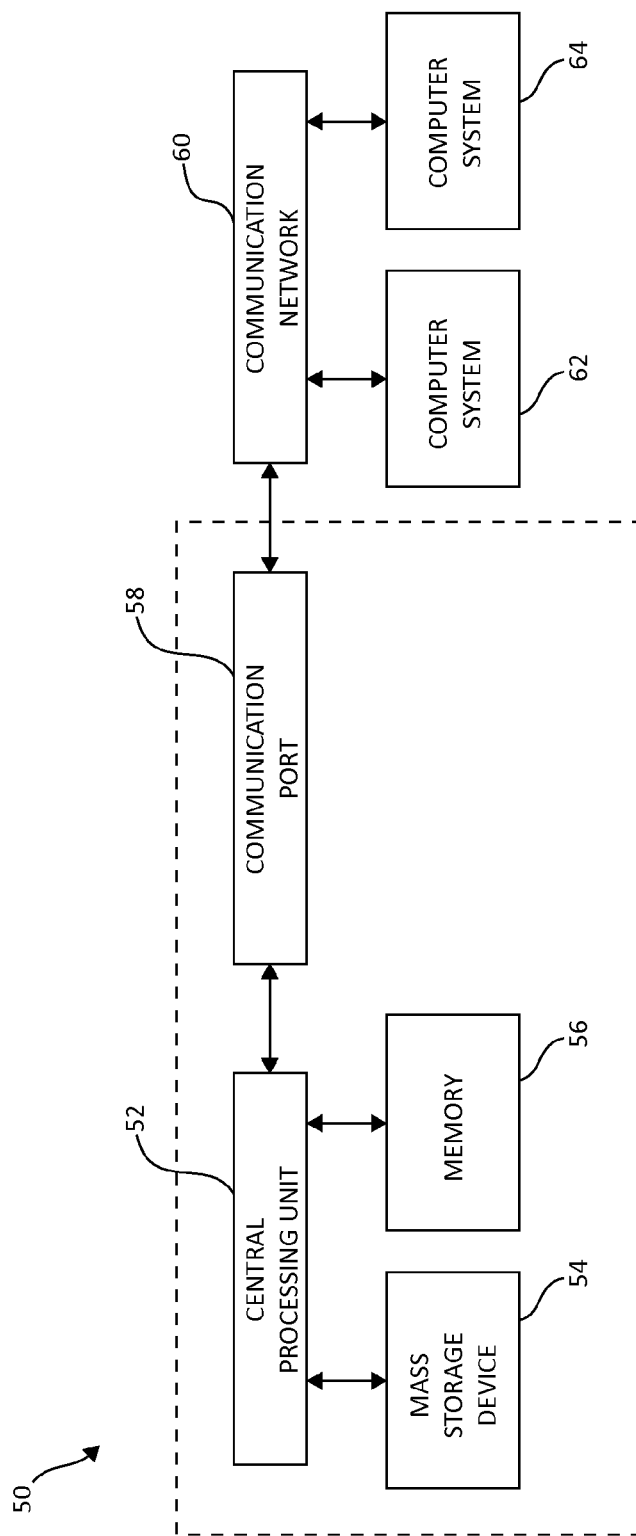
FIG. 1A is a block diagram illustrating a computing system environment having an example storage device in which aspects of the present invention may be realized.

As previously mentioned, a computer system may include a complex data processing system or computing environment. An enterprise storage server (ESS), such as the IBM® TotalStorage Enterprise Storage Server®, may be a disk storage server that includes one or more processors coupled to storage devices, including high capacity scalable storage devices, Redundant Array of Independent Disks (RAID), etc. The enterprise storage servers are connected to a network and include features for copying data in storage systems.

Peer-to-Peer Remote Copy (PPRC) is an ESS function that allows the shadowing of application system data from a first site to a second site. The first site may be referred to as an application site, a local site, or a primary site. The second site may be referred to as a recovery site, a remote site or a secondary site. The logical volumes that hold be data in the ESS at the local site are called local volumes, and the corresponding logical volumes that hold the mirrored data at the remote site are called remote volumes. High speed links, such as ESCON links may connect the local and remote ESS systems.

ESS currently supports a host reading directly from a secondary PPRC device. In addition, a peer-to-peer remote copy over fibre channel protocol (PPRC/FCP) relationship is typically established from a primary storage device to a secondary storage device in a PPRC operating environment. Thus, both the host and the PPRC/FCP primary may have concurrent access to the PPRC/FCP secondary device. In this case, the secondary is a target device for both the primary and an independent Host System.

Currently a need exists for increased efficiency for hyperswapping between two mirrored volumes on an open Systems server. For example, a common identifier is needed for both volumes of the mirror that is unique among all volumes accessible by a host server so that a multi-path device driver function can be used to swap between the mirrors without any disruption to the host applications. Thus, to address these current needs, As will be described herein, in one embodiment, for switching between mirrored volumes, a copy relation identification (ID) is created between mirrored volumes for using the copy relation ID in conjunction with a multi-path device driver for switching input/output (I/O) for applications between a first path to a second path between the mirrored volumes.

In one embodiment the Copy Relation Id may be used in conjunction with multi-path device driver on the host system to provide a simple and non-disruptive way to move all applications from one logical unit number (LUN) to a mirrored LUN at a separate site. The multi-path device driver function will swap I/O from one LUN to its mirrored LUN using function similar to the multi-path function to switch the I/O from one path to another path for a single LUN.

Accordingly, in one embodiment, by way of example only, a rack-power control module (RPC) module is used for allowing a local storage partition, located on a local server, for controlling a destination storage partition, located on a destination server, by piggybacking commands on power alerts issued by the RPC module in a clustered storage system. Hence, the RPC module is used as a way for a partition in a server to inform/control another partition (e.g., a partner partition) running on another server.

Turning now to FIG. 1, exemplary architecture 50 of a computing system environment is depicted. The computer system 50 includes central processing unit (CPU) 52, which is connected to communication port 58 and memory device 56. The communication port 58 is in communication with a communication network 60. The communication network 60 and storage network may be configured to be in communication with server (hosts) 64 and storage systems, which may include storage devices 54. The storage systems may include hard disk drive (HDD) devices, solid-state devices (SSD) etc., which may be configured in a redundant array of independent disks (RAID). The operations as described below may be executed on storage device(s) 54, located in system 50 or elsewhere and may have multiple memory devices 56 working independently and/or in conjunction with other CPU devices 52. Memory device 56 may include such memory as electrically erasable programmable read only memory (EEPROM) or a host of related devices. Memory device 56 and storage devices 54 are connected to CPU 52 via a signal-bearing medium. In addition, CPU 52 is connected through communication port 58 to a communication network 60, having an attached plurality of additional computer host systems 64. In addition, memory device 56 and the CPU 52 may be embedded and included in each component of the computing system 50. Each storage system may also include separate and/or distinct memory devices 56 and CPU 52 that work in conjunction or as a separate memory device 56 and/or CPU 52.

Figure 1B:
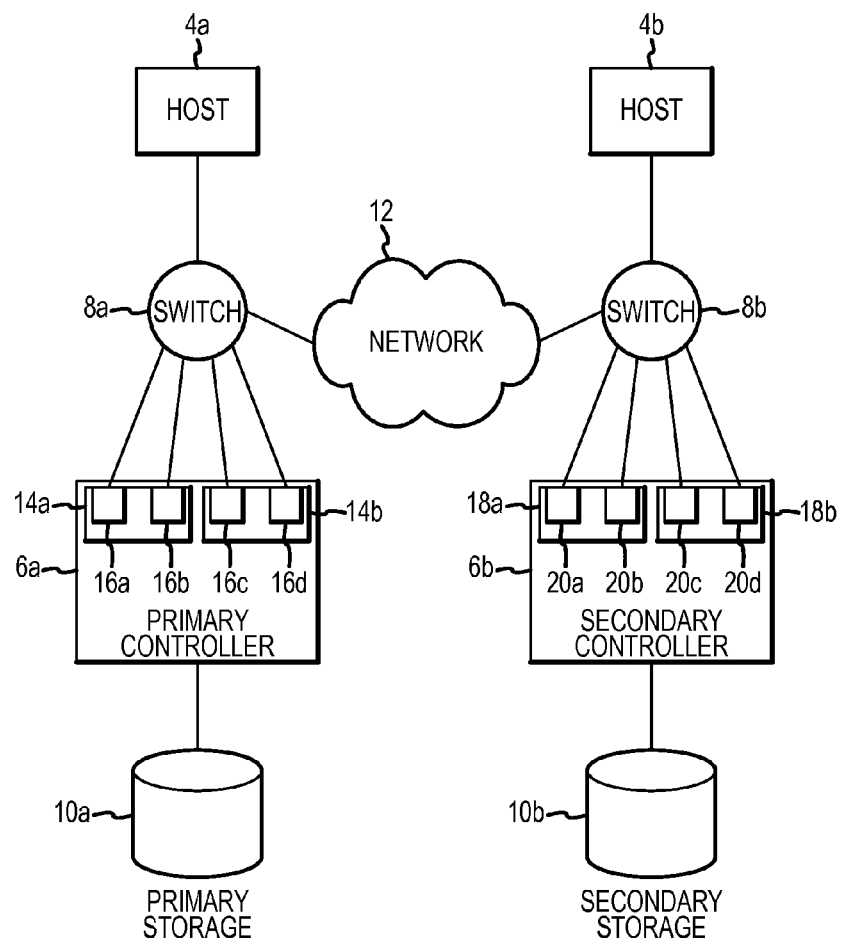
FIG. 1B is a block diagram illustrating an alternative computing system environment having an example storage device in which aspects of the present invention may be realized.

FIG. 1B is a block diagram illustrating an alternative computing system environment having an example storage device in which aspects of the present invention may be realized. Hosts 4a, b may comprise any computing device known in the art, including servers through which other client computers can access storage or clients. The hosts 4a, 4b, each include at least one adaptor, such as a Fibre Channel, SCSI adaptor card, or any other network adaptor card known in the art. The host adaptors allow the hosts 4a, 4b to communicate with storage controllers 6a, b via switches 8a, b. The switches 8a, b may comprise the international Business Machines Corporation (IBM®) Fibre Channel Storage Hub or Switch, the IBM® SAN Fibre Channel Switch, or any other switching device known in the art. Each switch 8a, b has a port connecting to a network 12, which may comprise any local area network, wide area network, the Internet or any other network system. The network 12 may use routers and switches to dynamically determine the data path through the network 12.

In one embodiment of the described implementations, a primary controller 6a includes interface cards 14a and b having ports 16a, b, c, d and a secondary controller 6b includes interface cards 18a and b having ports 20a, b, c, d. Primary controller 6a would communicate with the secondary controller 6b via one of the ports 16a, b, c, d, switch 8a, the network 12, switch 8b, and then one of the ports 20a, b, c, d on the secondary controller 6b. Thus, the primary controller 6a can select one of sixteen I/O paths to communicate with the secondary control 6b, i.e., one of the ports 16a, b, c, d paired with one of the ports 20a, b, c, d. In alternative embodiments, each of the controllers 6a, b may include a different number of interface cards having a different number of ports to provide more or less communication paths there between.

The secondary storage 10b maintains a mirror copy of specified data volumes in the primary storage 10a. During an establishment phase, a relationship is established between primary volumes in the primary storage 10a and corresponding secondary volumes in the secondary storage 10b that mirror the primary volumes. After this relationship is established, the primary controller 6a will write any updates from hosts 4a, b to primary volumes to the secondary controller 6b to write to the secondary volumes in the secondary storage 10b.

The primary and secondary controllers 6a, b may include IBM® Peer-to-Peer Remote Copy (PPRC), Extended Remote Copy (XRC) software, or other vender shadowing software to allow communication between the controllers 6a, b to coordinate data shadowing. In such embodiments, the controllers 6a, b may comprise large scale storage controllers, such as the IBM® 3990 and Enterprise Storage System class controllers. In open system embodiments, the primary and secondary controllers 6a, b may comprise controllers from different vendors of different models, etc., and may not include any specialized protocol software for performing the backup operations. Further, the controllers may include any operating system known in the art, including the Microsoft® Corporation Windows® operating systems.

In open systems embodiments, the primary controller 6a can use commonly used write commands, such as SCSI write commands, to copy the primary volumes to the secondary volumes in the secondary storage 10b. In such open system embodiments, the secondary controller 6b does not need special purpose software to coordinate the shadowing activities with the primary controller 6b as the primary controller 6a accomplishes the shadowing by using standard write commands. Further, in such open systems, the primary and secondary controllers 6a, b may comprise any controller device known in the art and the primary and secondary controllers 6a, b may be of different models and model types, and even of different classes of storage controllers.

To implement the mechanism described above, and in view of the computing environment presented in FIG. 1B, the host adapter associated with primary controller 6a may be instructed by the application level to sends I/O commands (e.g., write commands) to the host adapter associated with secondary controller 6b. The host adapter associated with the primary controller 6a then sets a control flag in the write command to indicate that the command and data contain a special task identifier. The host adapter associated with the primary controller 6a then copies the identifier into both the SCSI CDB and appends the same identifier to the end of the respective data frame. The host adapter then sends the write command and data (including the identifier as part of the data) over network 12 and switch 8b to the secondary controller 6b.

The host adapter associated with secondary con roller 6b receives the I/O (e.g., write) command. The host adapter associate with secondary controller 6b then checks for the control flag to indicate that the command and data contain the special identifier, and determines the control flag is set. The secondary controller 6b host adapter then compares the identifier in the SCSI CDB with the identifier appended at the end of the respective data frame. If the two identifiers match, the data is sent to cache, and good status notification is returned to primary controller 6a. If the two identifiers do not match, a SCSI Check Condition is returned to the primary controller 6a to indicate failure.

The identifier described above may vary according to a particular implementation. For example, in embodiments where the primary and secondary controllers are cooperative entities, information known to the secondary controller may be utilized. In one embodiment the identifier may include a logical block address (LBA), volume identification (volume ID), and/or track identification (track ID) information. Finally, the identifier may include a counter or count mechanism.

Figure 2:
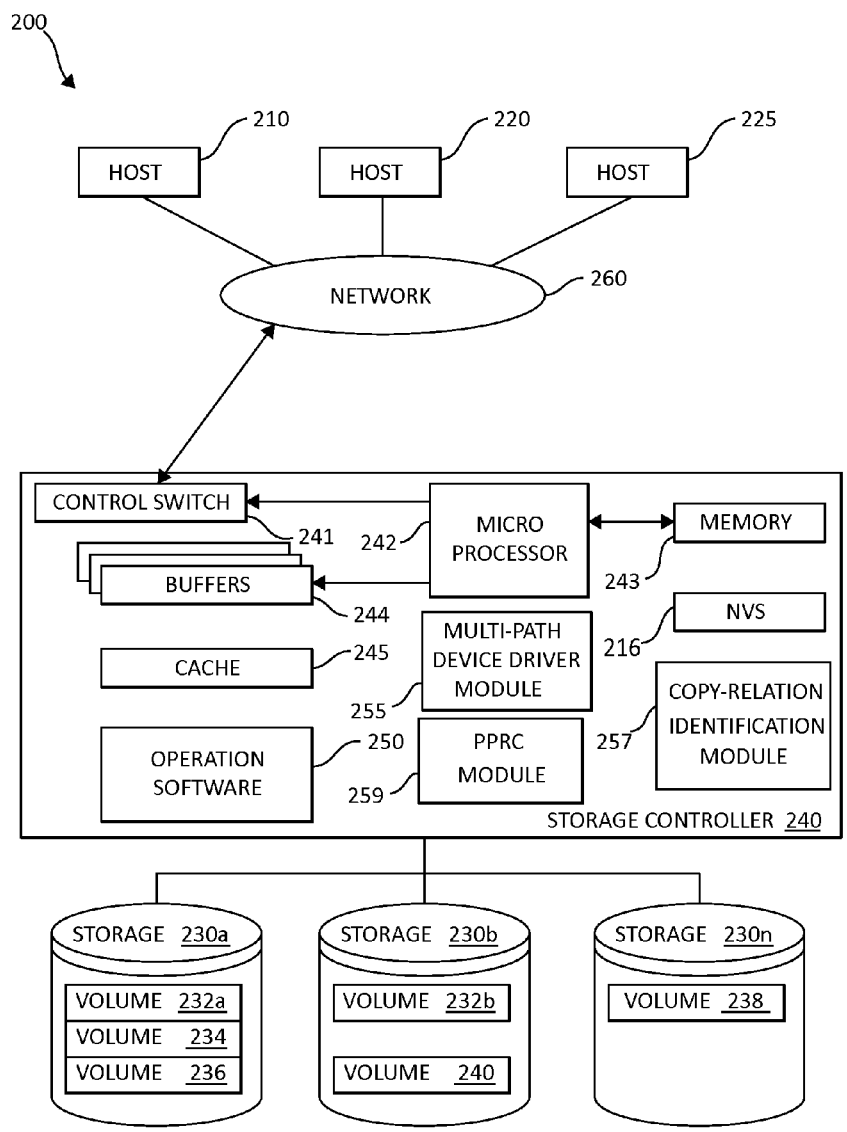
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a multi-path device driver 255, a copy relation identification module 257, and a PPRC module 259. The multi-path device driver 255, the copy relation identification module 257, and the PPRC module 259 may work in conjunction with each and every component of the storage controller 240, the hosts 210, 220, 225, and storage devices 230.

Each distributed data processing node/hosts, 210, 220, and 225 is associated with a service processor/microprocessor 242, e.g., service processors, each of which is responsible for booting its associated node and for assisting system-level service processor in monitoring each of the nodes; a service processor/microprocessor 242 may be associated with a node through a variety of physical connections to its associated node, e.g., the service processor's hardware card may attach to a PCI bus. It should be noted that each node may have a plurality of service processors/microprocessors 242, although only one service processor would be responsible for booting its associated node. The multi-path device driver 255, the copy relation identification module 257, and the PPRC module 259 may be structurally one complete module or may be associated and/or included with other individual modules. The multi-path device driver 255, the copy relation identification module 257, and the PPRC module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the multi-path device driver 255, the copy relation identification module 257, and the PPRC module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, multi-path device driver 255, the copy relation identification module 257, and the PPRC module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the multi-path device driver 255, the copy relation identification module 257, and the PPRC module 259 may also be located in the cache 245 or other components. As such, one or more of the multi-path device driver 255, the copy relation identification module 257, and the PPRC module 259 maybe used as needed, based upon the storage architecture and users preferences.

Figure 3:
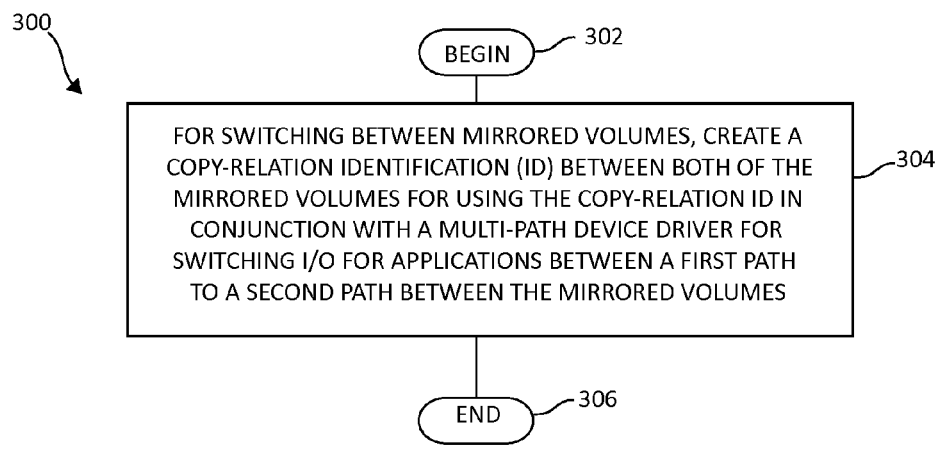
FIG. 3 is a flowchart illustrating an exemplary method for switching between mirrored volumes in a computing environment in which aspects of the present invention may be realized.

FIG. 3 is a flowchart illustrating an exemplary method 300 for switching between mirrored volumes in a computing environment. For switching between mirrored volumes in a enterprise storage system, the method 300 begins (step 302) by creating a copy relation identification (ID) between mirrored volumes for using the copy relation ID in conjunction with a multi-path device driver for switching input/output (I/O) for applications between a first path to a second path between the mirrored volumes (step 304). The method 300 ends (step 306).

FIG. 3 may be described with greater specificity as follows. A unique name (e.g., a copy relation Id or "CopyRelationId"), is created for both of the mirrored volumes that includes a volume ID of the primary mirror and a unique ID of the relationship. This copy relation Id is used to swap between the mirrored volumes without any application disruption. The copy relation Id can move between volumes, and also to a volume that was not part of the original mirror relationship, and may still be used to identify Hyperswap capable volumes.

When a PPRC relationship is created, a copy relation Id is assigned to the PPRC primary and PPRC secondary. The copy relation Id consists of the serial number of the primary PPRC and the timestamp of when the PPRC relation was created. The copy relation Id is unique throughout the subsystems managed by a host system. The copy relation Id is stored in metadata on both the PPRC primary and PPRC secondary so that the copy relation Id can be retained for the life of the host volume, regardless of what subsystem or site the physical volume resides in.

The copy relation Id is created for a volume when a volume changes from Simplex to PPRC primary. If the volume becomes Simplex again, it will still retain the copy relation Id so that the host access will not be interrupted. The copy relation Id will remain associated with the volume until a new PPRC relation is created for the volume. If a Hyperswap is performed, the PPRC secondary becomes the new PPRC primary and it will retain the same copy relation Id. (The hyperswap is a continuous availability solution wherein a set of nodes (and/or volumes) accessing a synchronously replicated storage system, containing a group of storage volumes, switch from a primary storage system to a secondary (replica) storage system, and must do so without any application outage in any node in the cluster. The hyperswap operation may take place because of a storage system failure, known as an unplanned hyperswap, or under administrative control, known as a planned hyperswap. Furthermore, the hyperswap operation may involve both boot volumes and non-boot volumes in the storage system.) If the new PPRC primary is re-established with a new PPRC secondary, the copy relation Id can be copied from the new PPRC primary to a new volume that becomes the new PPRC secondary.

If a copy relation Id is assigned to a volume, the copy relation Id will be returned to the host as a vendor-specific designation descriptor within the Device Identification VPD page (page 83h). This information is retained by the host system and used by multi-pathing drivers to switch from the PPRC primary to the PPRC secondary when timeouts or errors occur in communication with the PPRC primary. The switch takes advantage of the Target Port Group state to have active paths from the host system to the PPRC primary and standby paths from the host system to the PPRC secondary. When a timeout or error occurs while accessing the PPRC primary, the host system will switch to the PPRC secondary volume through the alternate path via the copy relation Id. The CopyRelationId can be used in conjunction with Multi-path Device Drivers on the host system to provide a simple and non-disruptive way to move all applications from one LUN to a mirrored LUN at a separate site.

To further describe the vendor-specific designation descriptor within the Device Identification VPD page (page 83h), it should be noted that with the increase in the number of different SCSI devices and SO command sets, a SCSI bus or SCSI device must be able to uniquely identify another SCSI device in order to receive a transmission from that device. These unique identifiers require global uniqueness, and must be identified with a technique that is commonly used throughout the world. Accordingly, as part of the shared command set standard, industry groups developed a SCSI Primary Commands-2 (SPC-2) document which provides SCSI primary command standards that are designed to be used industry wide. In this document, a standardized inquiry vital product data (VPD) page has been defined that may contain various identifiers with different characteristics for a SCSI device being addressed, and/or for a logical unit (e.g., addressable blocks of storage created from one or more disks contained within a SCSI device, which may provide a unique connection to an application program or another SCSI device) being addressed on a SCSI device. This page is called a Device Identification VPD page (described herein as "VPD 83h page").

Figure 4:
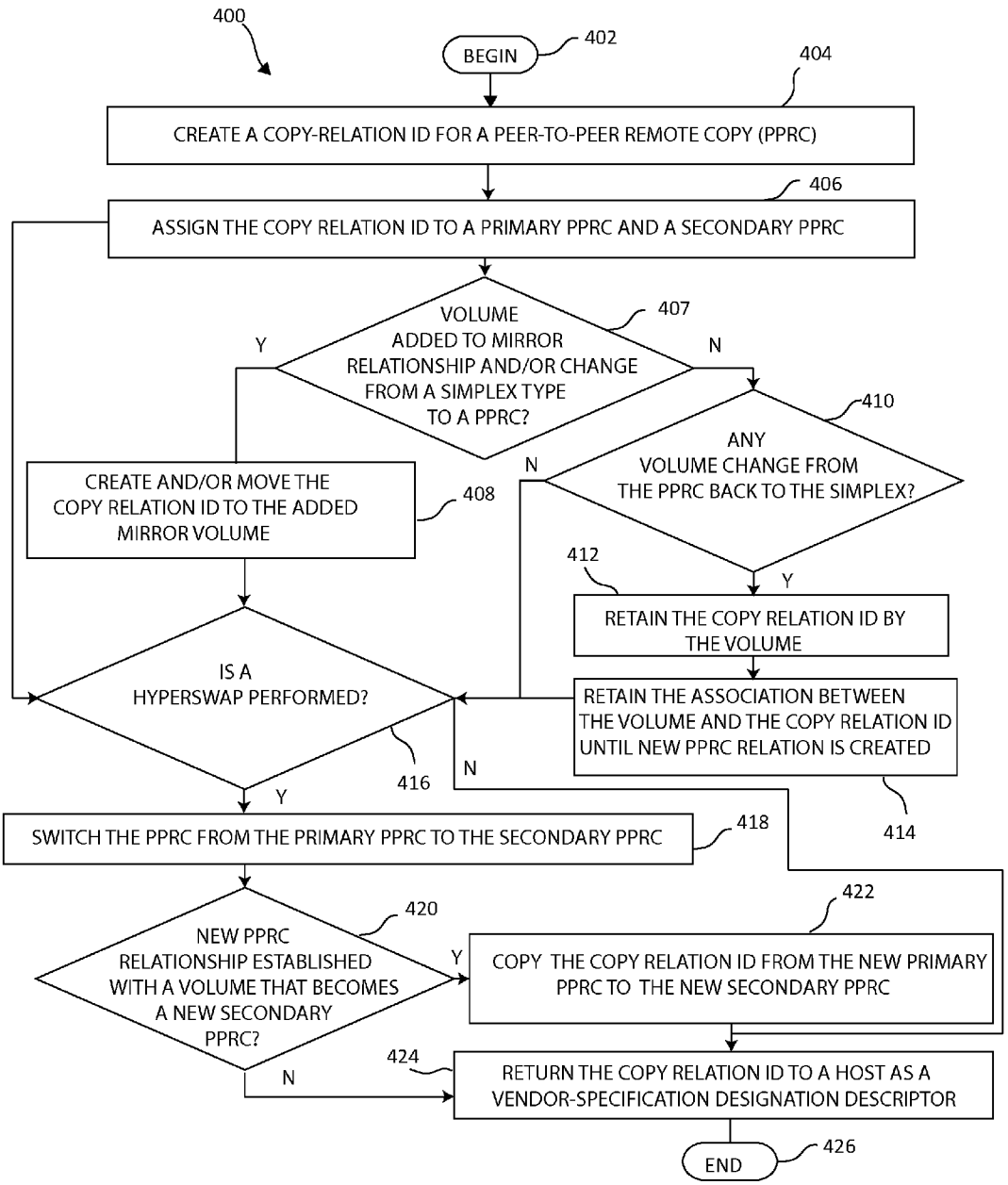
FIG. 4 is a flowchart illustrating an exemplary alternative method for switching between mirrored volumes in a computing environment in which aspects of the present invention may be realized.

Turning now to FIG. 4, FIG. 4 is a flowchart illustrating an exemplary method 400 for switching between mirrored volumes in a computing environment in which aspects of the present invention may be realized. The method 400 begins (step 402) by creating a copy relation identification (ID) (e.g., a unique name) for a peer-to-peer remote copy (PPRC) that includes a volume identification (ID) of a primary mirror and a unique ID of the mirror relationship (step 404). Assign the copy relation ID to a primary PPRC and a secondary PPRC (step 406). The copy relation ID is stored in metadata on both the primary PPRC and the secondary PPRC, and includes a serial number of the primary PPRC and a time stamp of the creation of a relationship between the primary PPRC and the secondary PPRC. The method 400 then determines if a volume is added to the mirrored relationship and/or changes from a simplex type volume to the peer-to-peer remote copy (PPRC) volume (step 407). If yes, the copy relation ID is created for and/or moved to the added volume (step 408). If no, the method 400 determines if any volume changes from the PPRC volume back to the simplex type volume (step 410). If the volume changes from the PPRC volume back to the simplex type volume, the copy relation ID is retained by the volume thereby a host access is not interrupted (step 412). If no, the method 400 may jump to step 416 and determine if a hyperswap is performed (step 416). After step 412, the method 400 may then retain the association between the volume and the copy relation ID until a new PPRC relation is created for the volume (step 414). From either step 406, 410, and/or 414, the method 400 may the determine if a hyperswap is performed (step 416). If yes, the method switches the peer-to-peer remote copy (PPRC) from being a primary PPRC to being a secondary PPRC (step 418). If no hyperswap is performed, the method 400 may move to step 424 and returns the copy relation ID to a host (step 424). At step 418, the secondary PPRC becomes a new primary PPRC and retains the copy relation ID created for the relationship between the primary PPRC and the secondary PPRC. The method 400 then determines if the new primary PPRC is established/re-established with a volume that becomes a new secondary PPRC (step 420). If yes, the copy relation ID is copied from the new primary PPRC to the new secondary PPRC (step 422). From step 404, upon assigning the copy relation ID to a volume, the method 400 returns the copy relation ID to a host as a vendor-specification designation descriptor within a device identification vital product data (VPD) page (step 424). The method 400 ends (step 426).

In one embodiment, as further described below in FIG. 5, in an Advanced IBM Unix (AIX) Multiple Path I/O (MPIO), along with an AIX Path Control Module (PCM), uses the "CopyRelationID" to identify multiple LUN's that are configured as a single device in a storage area network (SAN) replication Device. These LUN's configured as a SAN replication device are identified as a single disk instance on AIX. The state of the SAN replication device is determined by the PPRC state on the storage system. The state indicates whether a swap can be done from one LUN to another LUN configured as part of the SAN replication device. If a timeout occurs on a path, the SAN replication device state indicates it can be swapped and the retries on that path have exceeded a swap time threshold, the PCM will swap (e.g., failover) to another LUN configured as part of the SAN replication device. After the swap, the PCM will redirect the I/O to the SAN replication device on an alternate path, as it would redirect I/O to an alternate path for a single LUN in MPIO. Thus, the present invention allows multi-pathing drivers to swap I/O between mirrored LUNs using the same method that redirects I/O to an alternate path on the same LUN.

Figure 5:
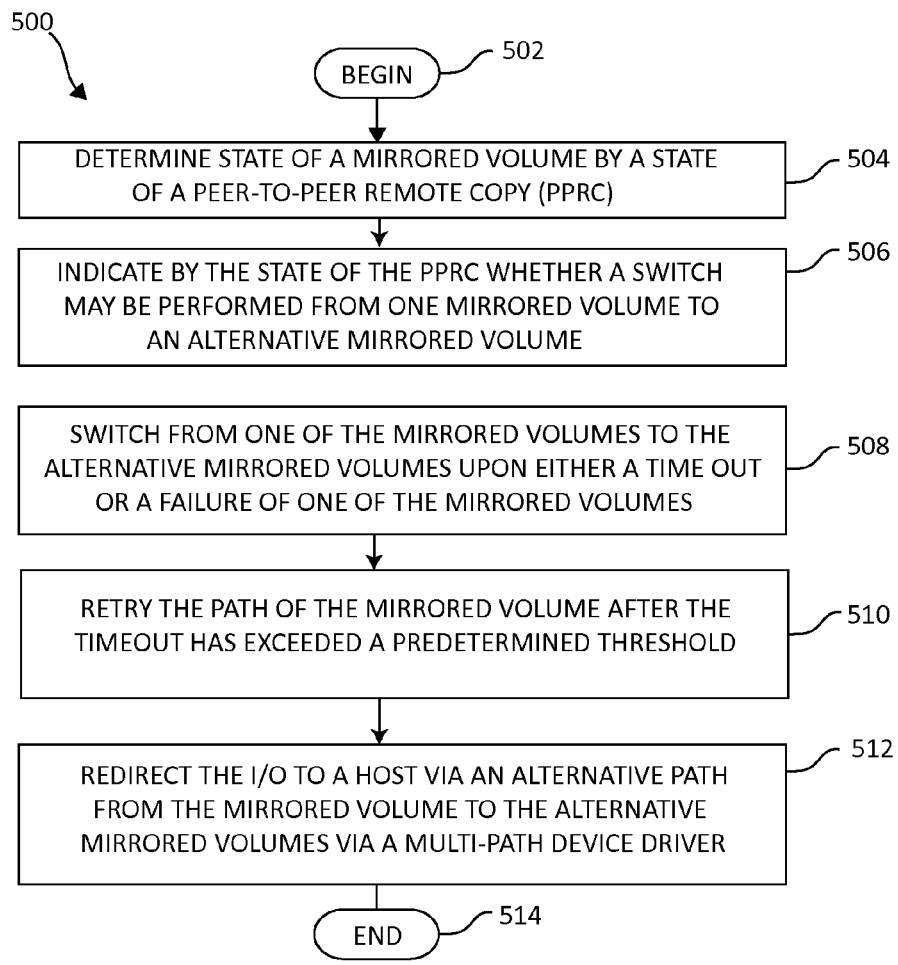
FIG. 5 is a flowchart illustrating an alternative exemplary method for switching between mirrored volumes in a computing environment in which aspects of the present invention may be realized.

FIG. 5 is a flowchart illustrating an alternative exemplary method 500 for switching between mirrored volumes in a computing environment in which aspects of the present invention may be realized. The method 500 begins (step 502) by determining a state of one of the mirrored volumes by a state of a peer-to-peer remote copy (PPRC) (step 504). The method 500 indicates by the state of the peer-to-peer remote copy (PPRC) whether a switch may be performed from one of the mirrored volumes to an alternative one of the mirrored volumes (step 506). The method 500 switches (swaps) from one of the mirrored volumes to an alternative one of the mirrored volumes upon either a time out or a failure of one of the mirrored volumes (step 508). Next, the method 500 may retry a path for the mirrored volume after the timeout has exceeded a threshold (step 510). After performing the switching, the method 500 may redirect the I/O to a host via an alternative path from the one of the mirrored volumes to the alternative one of the mirrored volumes via a multi-path device drivers (step 512). The method 500 ends (step 514).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for switching between mirrored volumes by using a processor device in a computing environment, the method, executed by the processor device, comprising:
    creating, by the processor device, a copy relation identification (ID) created for both mirrored volumes for using the copy relation ID in conjunction with a multi-path device driver for switching input/output (I/O) for applications between a first path to a second path between the mirrored volumes, wherein the copy relation ID includes a primary volume ID of the primary mirror, a secondary volume ID for a second mirror, and a unique ID of a relationship between the mirrored volumes, the copy relation ID is a common identifier for both the mirrored volumes that is unique among all volumes; and
    using the copy relation ID for identifying volumes capable of hyperswaping and switching I/O for applications between the first path to the second path between the mirrored volumes.

2. The method of claim 1, further including returning the copy relation ID to a host via a vendor-specification designation descriptor in the event of a failover.

3. The method of claim 1, further including moving the copy relation ID between one of each of the mirrored volumes and a volume that was later added to the mirrored volumes, wherein the copy relation ID identifies the mirrored volumes capable of performing a hyperswap.

4. The method of claim 1, further including, upon creating a peer-to-peer remote copy (PPRC), assigning the copy relation ID to a primary PPRC and a secondary PPRC, wherein the copy relation ID is stored in metadata on both the primary PPRC and the secondary PPRC, includes a serial number of the primary PPRC and a time stamp of the creation of a relationship between the primary PPRC and the secondary PPRC.

5. The method of claim 1, further including:
creating the copy relation ID in a volume when the volume changes from a simplex type volume to a peer-to-peer remote copy (PPRC) volume, wherein if the volume changes back to the simplex type volume the copy relation ID retained and thereby a host access is not interrupted, and
retaining an association between the volume and the copy relation ID until a new PPRC relation is created for the volume.

6. The method of claim 5, further including:
switching the PPRC from being a primary PPRC to being a secondary PPRC if a hyperswap is performed, wherein the secondary PPRC becomes a new primary PPRC,
retaining the copy relation ID created for the relationship between the primary PPRC and the secondary PPRC, and
if the new primary PPRC is re-established with a volume that becomes a new secondary PPRC, copying the copy relation ID from the new primary PPRC to the new secondary PPRC.

7. The method of claim 6, further including, upon assigning the copy relation ID to a volume, returning to a host as a vendor-specification designation descriptor within a device identification vital product data (VPD) page.

8. The method of claim 1, further including:
determining a state of one of the mirrored volumes by a state of a peer-to-peer remote copy (PPRC),
indicating by the state of the PPRC whether a switch may be performed from one of the mirrored volumes to an alternative one of the mirrored volumes,
switching from the one of the mirrored volumes to the alternative one of the mirrored volumes upon one of a time out and a failure of the one of the mirrored volumes,
retrying a path for the one of the mirrored volume after the timeout has exceeded a threshold, and
after performing the switching, redirecting the I/O to a host via an alternative path from the one of the mirrored volumes to the alternative one of the mirrored volumes via the multi-path device driver.

9. A system for switching between mirrored volumes in a computing environment, the system comprising:
a multi-path device driver,
a processor device, in communication with the multi-path device driver, operable in the computing storage environment, wherein the processor device:
creates a copy relation identification (ID) created for both mirrored volumes for using the copy relation ID in conjunction with the multi-path device driver for switching input/output (I/O) for applications between a first path to a second path between the mirrored volumes, wherein the copy relation ID includes a primary volume ID of the primary mirror, a secondary volume ID of the second minor, and a unique ID of a relationship between the mirrored volumes, the copy relation ID is a common identifier for both of the mirrored volumes that is unique among all volumes; and
using the copy relation ID for identifying volumes capable of hyperswaping and switching I/O for applications between the first path to the second path between the mirrored volumes.

10. The system of claim 9, wherein the processor device, upon assigning the copy relation ID to a volume, returns the copy relation ID to a host via a vendor-specification designation descriptor in the event of a failover.

11. The system of claim 9, wherein the processor device moves the copy relation ID between one of each of the mirrored volumes and a volume that was later added to the mirrored volumes, wherein the copy relation ID identifies the mirrored volumes capable of performing a hyperswap.

12. The system of claim 9, wherein the processor device, upon creating a peer-to-peer remote copy (PPRC), assigns the copy relation ID to a primary PPRC and a secondary PPRC, wherein the copy relation ID is stored in metadata on both the primary PPRC and the secondary PPRC, includes a serial number of the primary PPRC and a time stamp of the creation of a relationship between the primary PPRC and the secondary PPRC.

13. The system of claim 9, wherein the processor device:
creates the copy relation ID in a volume when the volume changes from a simplex type volume to a peer-to-peer remote copy (PPRC) volume, wherein if the volume changes back to the simplex type volume the copy relation ID retained and thereby a host access is not interrupted, and
retains an association between the volume and the copy relation ID until a new PPRC relation is created for the volume.

14. The system of claim 13, wherein the processor device:
switches the PPRC from being a primary PPRC to being a secondary PPRC if a hyperswap is performed, wherein the secondary PPRC becomes a new primary PPRC,
retains the copy relation ID created for the relationship between the primary PPRC and the secondary PPRC, and
if the new primary PPRC is re-established with a volume that becomes a new secondary PPRC, copies the copy relation ID from the new primary PPRC to the new secondary PPRC.

15. The system of claim 14, wherein the processor device assigns the copy relation ID to a volume and returns to a host as a vendor-specification designation descriptor within a device identification vital product data (VPD) page.

16. The system of claim 9, wherein the processor device:
determines a state of one of the mirrored volumes by a state of a peer-to-peer remote copy (PPRC),
indicates by the state of the PPRC whether a switch may be performed from one of the mirrored volumes to an alternative one of the mirrored volumes,
switches from the one of the mirrored volumes to the alternative one of the mirrored volumes upon one of a time out and a failure of the one of the mirrored volumes,
retries a path for the one of the mirrored volume after the timeout has exceeded a threshold, and
after performing the switching, redirects the I/O to a host via an alternative path from the one of the mirrored volumes to the alternative one of the mirrored volumes via the multi-path device driver.

17. A computer program product for switching between mirrored volumes by a processor device, the computer program product comprising a non-transitory computer-readable storage medium having computer-readable program code portions stored therein, the computer-readable program code portions comprising:
a first executable portion that creates a copy relation identification (ID) created for both mirrored volumes for using the copy relation ID in conjunction with a multi-path device driver for switching input-output (I/O) for applications between a first path to a second path between the mirrored volumes, wherein the copy relation ID includes a primary volume ID of the primary mirror, a secondary volume ID of the second minor, and a unique ID of a relationship between mirrored volumes, the copy relation ID is a common identifier for both of the mirrored volumes that unique to all volumes; and using the copy relation ID for identifying volumes capable of hyperswaping and switching I/O for applications between the first path to the second path between the mirrored volumes.

18. The computer program product of claim 17, further including a second executable portion that, upon an assignment of the copy relation ID to a volume, returns the copy relation ID to a host via a vendor-specification designation descriptor in the event of a failover.

19. The computer program product of claim 17, further including a second executable portion that moves the copy relation ID between one of each of the mirrored volumes and a volume that was later added to the mirrored volumes, wherein the copy relation ID identifies the mirrored volumes capable of performing a hyperswap.

20. The computer program product of claim 17, further including a second executable portion that, upon creating a peer-to-peer remote copy (PPRC), assigns the copy relation ID to a primary PPRC and a secondary PPRC, wherein the copy relation ID is stored in metadata on both the primary PPRC and the secondary PPRC, includes a serial number of the primary PPRC and a time stamp of the creation of a relationship between the primary PPRC and the secondary PPRC.

21. The computer program product of claim 17, further including a second executable portion that:

creates the copy relation ID in a volume when the volume changes from a simplex type volume to a peer-to-peer remote copy (PPRC) volume, wherein if the volume changes back to the simplex type volume the copy relation ID retained and thereby a host access is not interrupted, and retains an association between the volume and the copy relation ID until a new PPRC relation is created for the volume.

22. The computer program product of claim 21, further including a third executable portion that:

switches the PPRC volume from being a primary PPRC to being a secondary PPRC if a hyperswap is performed, wherein the secondary PPRC becomes a new primary PPRC, retains the copy relation ID created for the relationship between the primary PPRC and the secondary PPRC, and if the new primary PPRC is re-established with a volume that becomes a new secondary PPRC, copies the copy relation ID from the new primary PPRC to the new secondary PPRC.

23. The computer program product of claim 22, further including a fourth executable portion that assigns the copy relation ID to a volume and returns to a host as a vendor-specification designation descriptor within a device identification vital product data (VPD) page.

24. The computer program product of claim 17, further including a second executable portion that:

determines a state of one of the mirrored volumes by a state of a peer-to-peer remote copy (PPRC), indicates by the state of the PPRC whether a switch may be performed from one of the mirrored volumes to an alternative one of the mirrored volumes, switches from the one of the mirrored volumes to the alternative one of the mirrored volumes upon one of a time out and a failure of the one of the mirrored volumes, retries a path for the one of the mirrored volume after the timeout has exceeded a threshold, and after performing the switching, redirects the I/O to a host via an alternative path from the one of the mirrored volumes to the alternative one of the mirrored volumes via the multi-path device driver.

* * * * *